Aug. 9, 1966

G. R. WINDERS 3,264,952

NUCLEAR SAFETY ROD ACTUATOR

Filed May 1, 1964

INVENTOR.
Gordon R. Winders
BY
ATTORNEY

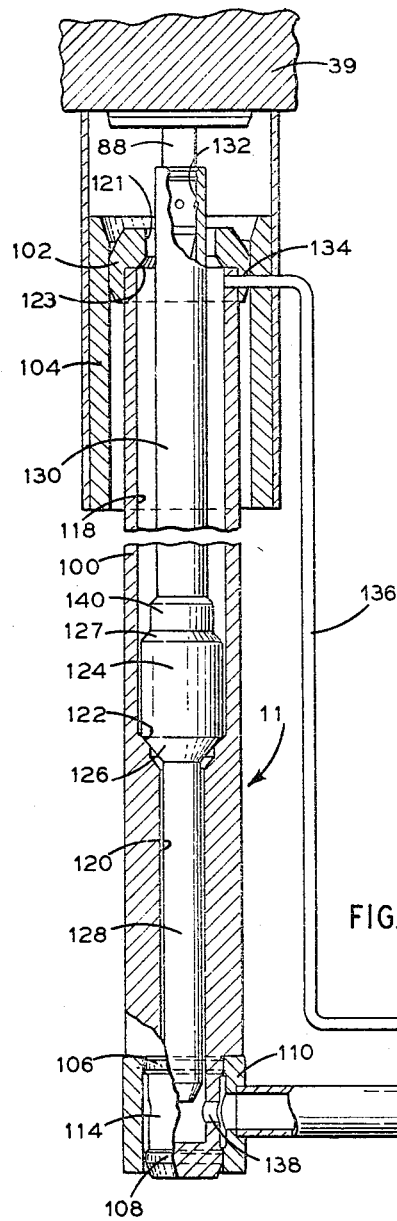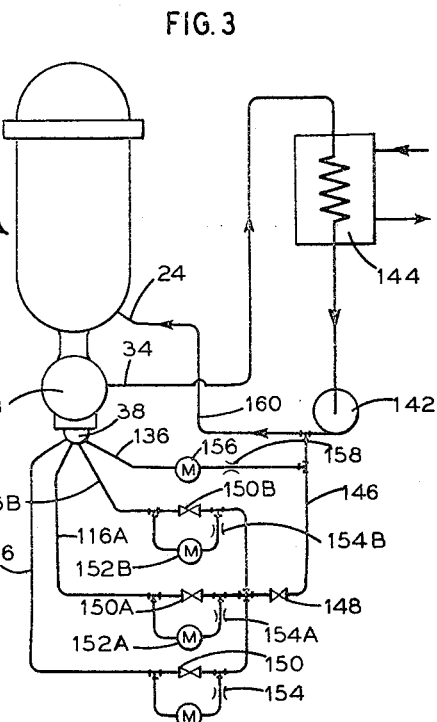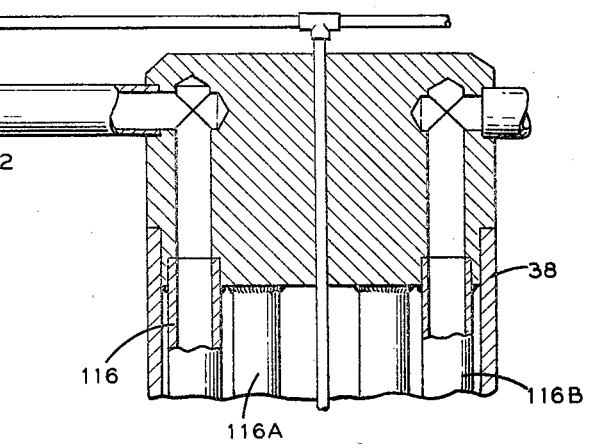

United States Patent Office 3,264,952
Patented August 9, 1966

3,264,952
NUCLEAR SAFETY ROD ACTUATOR
Gordon R. Winders, Lynchburg, Va., assignor to The Babcock & Wilcox Company, New York, N.Y., a corporation of New Jersey
Filed May 1, 1964, Ser. No. 364,258
14 Claims. (Cl. 92—162)

This invention relates in general to a nuclear safety rod actuator, and more specifically to a hydraulically operated, fail-safe safety rod actuator for inserting or withdrawing a safety rod containing a neutron poison material into or out of a nuclear reactor core.

A self-sustaining nuclear chain reaction utilizes neutrons which cause atoms of a nuclear fuel material to fission, releasing additional neutrons and other energy which may be utilized for useful purposes. The power generated by a nuclear reactor core is determined by the arrangement of the core including the amount of nuclear material therein, its configuration, and the number of neutrons which are available for sustaining the chain reaction. The number of neutrons so available is determined by the number of neutrons which are generated by the fissioning of the fuel material minus the neutrons which are lost from the periphery of the reactor and the number which are absorbed non-reproductively either by the structural material within the core or by neutron poison material placed within the core for control purposes. The regulation of the power level of the nuclear reactor is generally accomplished by movably positioning control rods, which contain a neutron poison material, within the core. Thus, as the control rods are withdrawn from the reactor core less neutron poisoning material is present for reducing the number of neutrons available to continue the chain reaction and so the power level is increased. As more poison material is introduced into the core, by the insertion of the control rods, the power level of the reactor is reduced and, in many reactors, full insertion of the control rods terminates the chain reaction. Thus, both regulation of power output and the termination of the chain reaction are accomplished by the same control rods. However, in other reactors one or more regulating rods are utilized for controlling the power level of the reactor with separate and distinct safety rods being utilized for terminating the chain reaction. Such safety rods are required to have only two positions within the reactor, either full in or full out. Reactors using this method of control, with separate regulating rods and safety rods, are simpler and more economical since only the regulating rods require the complicated mechanisms necessary to continuously vary the position of the control rods within the core in accordance with the power output requirements, while the safety rod mechanisms may be simple two-position mechanisms.

The present invention is directed to an improved safety rod actuator system capable of either fully inserting or fully withdrawing safety rods from the reactor core. The arrangement of the present invention provides a fail-safe arrangement whereby the safety rods are withdrawn from the reactor core one at a time with no possibility for sudden and unanticipated movement of more than one safety rod out of the core at any time thereby eliminating the hazards of sudden, uncontrolled variations in the reactivity of the core. Furthermore, with the arrangement of the present invention, should a failure occur in the reactor, causing one of the safety rods to be inserted into the reactor core, all of the safety rods are automatically inserted into the core, terminating the chain reaction and preventing any hazardous conditions from arising.

The safety rod actuator of the present invention furthermore utilizes a simple relatively inexpensive mechanism requiring a minimum of auxiliary equipment. The fact that these actuators may be operated by the same coolant pumps used for circulating the coolant through the reactor contributes to the reduction in auxiliary equipment possible. Furthermore, should a failure occur in the reactor coolant system, the safety rods are promptly and automatically inserted into the core, shutting down the reactor and avoiding hazardous operating conditions.

Accordingly, the present invention provides a nuclear safety rod actuator comprising a cylinder and piston arrangement, with one end of the piston being connected to a safety rod. The cylinder has an internal diameter at each end which is smaller than the diameter of the piston and an internal diameter, extending the distance between the ends, which is somewhat greater than the diameter of the piston forming a restricted annular flow space between the piston and the cylinder. Means is provided for introducing a fluid at a predetermined flow rate into one end of the cylinder with the flow rate being related to the restricted flow space so as to produce a pressure drop across the piston sufficient to move the piston to the opposite end of the cylinder. Means is provided to minimize the fluid flow through the restricted flow space when the piston reaches the opposite end of the cylinder and the piston is then maintained at the opposite end of the cylinder by a predetermined reduced rate of fluid flow to the cylinder. Means is also provided for returning the piston to the first end of the cylinder when the flow rate falls below the predetermined reduced rate.

The present invention also provides a safety rod actuator system comprising a plurality of the safety rod actuators whereby the actuators may only be operated sequentially so that a second piston with its associated safety rod will not move until the first piston has reached the opposite end of its cylinder.

Furthermore, this safety rod system provides means for reducing the fluid flow to the system to a predetermined reduced flow rate when all of the pistons have reached the opposite ends of the cylinders. The predetermined reduced flow rate is sufficient to maintain the pistons at the opposite ends of the cylinders during normal reactor operation and yet is not enough to maintain the pistons in this position should the flow rate be increased through one of the restricted flow spaces as a result of one of the pistons leaving the opposite end of the corresponding cylinder.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:

FIG. 2 is an enlarged sectional view of a safety rod actuator of the present invention; and FIG. 3 illustrates the actuator control system of the present invention.

Figure 1:
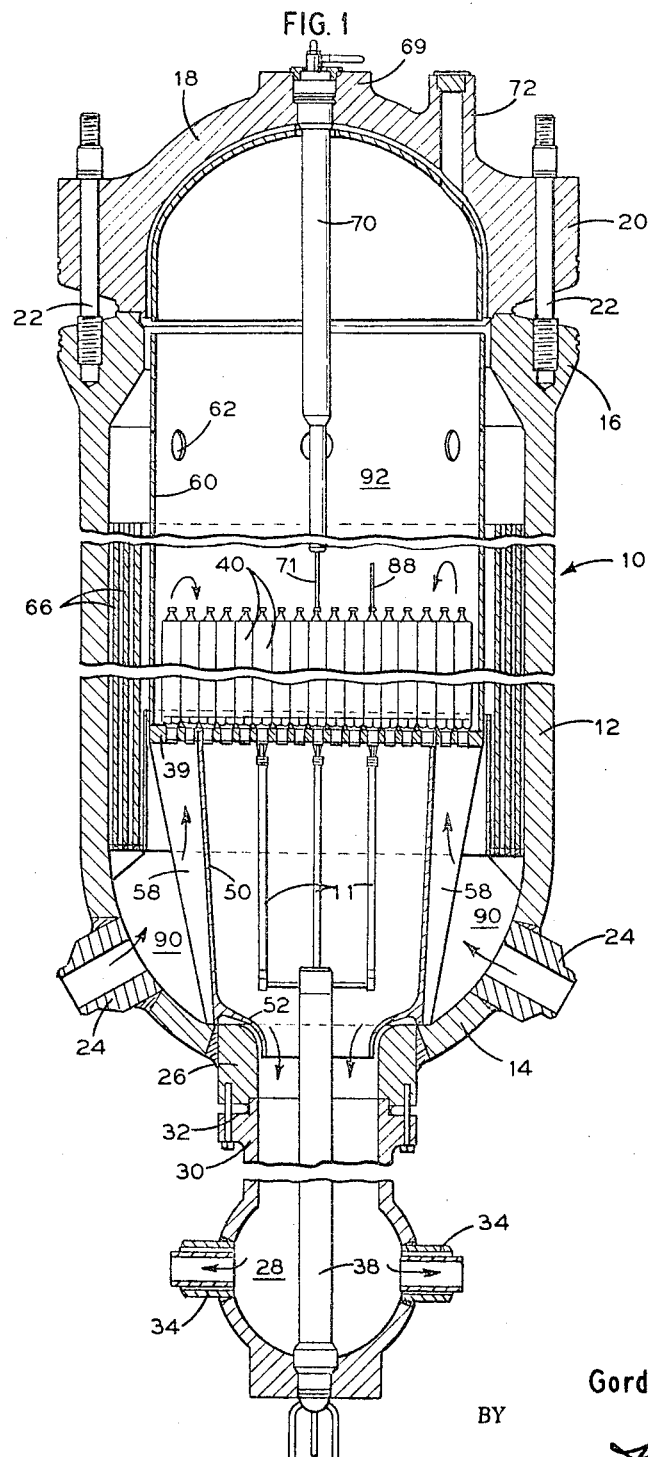
FIG. 1 illustrates a vertical section of a nucelar reactor incorporating the present invention.

FIG. 1 illustrates a reactor 10 incorporating safety rods having actuator mechanisms 11 which comprise the present invention. The reactor 10 comprises a vertically elongated cylindrical pressure vessel 12 which is closed at the lower end by an integrally formed hemispherical lower head 14 and terminates in an open upper end which is bounded by a closure flange 16. A removable upper closure 18, having a closure flange 20 arranged to mate with flange 16, is maintained in fluid-tight relation with the open end of the pressure vessel 12 by a plurality of circumferentially disposed bolted studs 22. The lower head 14 is provided with a plurality of circumferentially spaced inlet nozzles 24 and a centrally disposed plenum nozzle 26. The nozzle 26 is secured in fluid-tight relation to the upper end of an elongated cylindrical outlet extension 30 by a flange 32. The lower end of the outlet extension 30 terminates in an outlet plenum chamber 28. The plenum chamber 28 is provided with a plurality of circumferentially spaced outlet nozzles 34 extending horizontally therefrom, and a safety rod actuator manifold 38 which will be described in more detail later.

A support grid plate 39 in the lower portion of the pressure vessel 12 supports the core fuel elements 40, which are arranged, in a manner well known in the art, as a core capable of undergoing a self-sustaining fission-type chain reaction. The grid plate 39 is connected to and is borne by a skirt member 50 which extends downwardly from the grid plate 39 and is supported at its lower end by the lower head 14 of the pressure vessel. Connected to the interior of the lower portion of the skirt member 50 is a flow transition member 52 which directs the flow of fluid from the skirt member to the centrally positioned plenum nozzle 26. While not shown, this transition member may extend into the outlet plenum 28, if desired, to form a thermal shield adjacent the walls of the plenum chamber, the flange 32, and the outlet extension 30, to minimize thermal shock within these components. If necessary, a plurality of support ribs 58 may be radially disposed around the support skirt 50 to aid in the support of the grid plate 39. A substantially cylindrical core tank member 60 extends upwardly from the periphery of the grid plate 39 to the upper portion of the pressure vessel 12. A plurality of openings 62 may be provided in the upper portion of the core tank member 60 to permit fluid flow therethrough, as will be more fully described hereinafter. Arranged around the periphery of the core and supported at their lower extremities by the pressure vessel, are a plurality of concentric spaced thermal shields 66 arranged in a manner well known in the art.

Extending through the central portion of the upper closure head 18 is a nozzle 69 which accommodates a regulating rod drive mechanism 70. This mechanism is connected to and operates a regulating rod 71 disposed centrally of the reactor core. A refueling nozzle 72 may also be provided in the upper closure head.

Disposed in the lower portion of the pressure vessel are a plurality of safety rod actuators 11 each of which is connected to the lower end of an associated safety rod 88, one of which is illustrated partially withdrawn from the core. The safety rods are of a type well known in the art. These safety rods, containing neutron poison material, extend upwardly through or between selected core fuel elements 40 and are arranged so that the poison material is inserted within the core when the rods are in their lowermost position. The safety rods 88 are inoperative insofar as the regulation of core power output is concerned when they are withdrawn from the core. The safety rod actuator mechanisms are connected to the safety rod actuator manifold 38.

The fuel elements 40 may be of any type well known in the art. The central fuel element of the core is arranged with a passage therethrough to accommodate the regulating rod 71 which is inserted or withdrawn from the reactor to provide reactivity adjustment as previously described. Selected fuel elements in the core may be provided with passageways therethrough for the accommodation of the safety rods 88, or the safety rods may be positioned between adjacent fuel elements. As previously noted, during normal reactor operation the safety rods are completely removed from the core and are only inserted within the core when it is desired to stop the chain reaction, shutting the reactor down. Thus, the safety rod actuator need only be a two-position mechanism, positioning the safety rod in either a fully withdrawn or fully inserted position with respect to the core.

The reactor coolant fluid is introduced into the reactor illustrated through inlet nozzles 24, into the annular flow space 90 formed between the pressure vessel wall and the support skirt member 50. The coolant then passes upwardly through the grid plate 39 and thence through the outermost of the fuel elements 40 to the upper plenum chamber 92 as generally indicated by the arrows. Some of the coolant passes upwardly through the spaces between the thermal shields 66 spaced outside the core tank member 60 to the upper portion of the reactor pressure vessel where it also enters the upper plenum chamber 92 through openings 62 in the core tank member. The two portions of the coolant discharging from the thermal shields and the outermost fuel elements mix in the upper plenum chamber 92 and then flow downwardly through the center fuel elements. In passing through the fuel elements 40, the coolant absorbs heat therefrom; it then flows through the center portion of the grid plate 39 to the outlet plenum chamber 28 and outlet nozzles 34 to a point of use, not shown.

Referring now to FIG. 2, an enlarged sectional view of the safety rod actuator mechanism 11 of the present invention is illustrated. The safety rod actuator comprises a cylinder member 100 which is supported at its upper end by a collar member 102 secured to member 100 and which fits tightly within a sleeve member 104 suspended from the bottom of grid plate 39. The lower end of the cylinder member 100 has a portion of reduced outer diameter 114 having collar members 106 and 108 formed thereon. These collar members fit tightly within a small sleeve member 110 which is connected to the actuator manifold 38 by a radially extending tubular member 112. The reduced diameter 114 between the collars 106 and 108 forms an inlet plenum therebetween which is in fluid flow communication with tubular member 112, which in turn communicates with a tubular member 116 extending upwardly through the actuator manifold 38. The safety rod actuator mechanism 11 is so sized and arranged that it may be inserted from the top of the reactor down through the opening provided in the grid plate 39 for the fuel element and nozzle. Collars 102, 106 and 108 are so arranged that they make a tight fit within their respective sleeves 104 and 110 at normal ambient temperatures and when the reactor is at normal operating temperatures an interference fit is achieved between these collars and their respective sleeves because of the different materials these elements are formed of to securely maintain the actuators in position.

The cylinder member 100 has a length greater than the travel of the safety rod from full insertion in the reactor core to full withdrawal therefrom and has a bore 118 formed therein throughout the major portion of its length. At either end of bore 118, cylinder member 100 is provided with reduced diameter bores 120 and 121 with conical surfaces 122 and 123 joining them with bore 118. A piston member 124, having an outside diameter slightly less than the diameter of bore 118 and disposed within cylinder member 100 is free to move longitudinally therein. The relationship between the outside diameter of piston 124 and the diameter of bore 118 is such as to form a restricted annular fluid flow space therebetween. Both ends of the piston are provided with conical surfaces 126 and 127 which are arranged to mate with conical surfaces 122 and 123 to minimize fluid flow through the restricted flow space when the piston is at either extremity of travel. The piston 124 is provided with a lower extension 128 which extends downwardly through bore 120 and terminates in the space between collars 106 and 108 when the piston is in its lowermost portion. The piston 124 also has an upper extension 130, having a length substantially equal to the travel of the safety rod, which extends upwardly through the cylinder member 100 and through the reduced diameter bore 121 at the top of the cylinder member 100. The upper end of the extension 130 is provided with a connecting means, such as an internal bore 132, arranged to be connected to the lowermost end of the safety rod 88 in a manner well known in the art. A small flow orifice 134 is provided through the upper end of the cylinder member 100 in communication with a tubular member 136 which extends through actuator manifold 38 to the exterior of the reactor. While only one safety rod actuator mechanism 11 is illustrated in FIG. 2, each actuator mechanism in the reactor is provided with a separate tubular member 116 which extends through the actuator manifold 38 to a source of actuator fluid exterior of the reactor. The line 136, however, may be common to all actuators as will be more thoroughly described hereinbelow.

The actuator mechanism 11 is supplied with fluid from a source exterior of the reactor through line 116 which enters the reactor and extends upwardly through the actuator manifold 38. The fluid then passes through line 112 to the actuator inlet plenum, formed between collars 106 and 108, where it enters the lower end of bore 120 through an opening 138 provided in the wall 114 of the cylinder member. The fluid so supplied then passes upwardly through bore 120 and through the restricted flow space formed between the piston 124 and bore 118. The pressure supplied to the lower end of the cylinder member 100 is maintained sufficiently higher than the fluid receiver to which it ultimately passes so that the fluid pressure drop across the piston is sufficient to cause the piston and the safety rod 88, which is connected thereto, to move upwardly until the conical surface 127, formed on the upper end of the piston, mates with conical surface 123 in the upper end of the cylinder member 100. At this time, the flow of fluid through the cylinder member is substantially stopped, with only a minimal flow passing between the mating conical surfaces to cool the actuator mechanism 11 and prevent deposition of foreign material between the mating surfaces. At this time the flow to the actuator may be reduced to a predetermined reduced rate which is sufficient to maintain the piston and its associated safety rod in the upper position. Upon a further reduction of flow to the actuator below the predetermined reduced rate, the piston will fall until the lower conical surface 126 of the piston contacts the lower conical surface 122 of the cylinder member 100. The lower extension 128 of the piston, upon entering bore 120 at the lower end of the cylinder, restricts the descent of the piston and safety rod at the lower end of travel and acts as a shock absorber to reduce the deceleration forces imposed upon the piston and safety rod. The upper end of the piston is provided with a portion 140 having an outer diameter sized between that of the piston 124 and the upper extension 130 so that, during upward motion, it provides the same shock absorber action when it enters bore 121 at the upper end of the cylinder.

In a reactor having a plurality of actuators similar to the one illustrated, the flow rate of the fluid utilized for actuating the mechanisms is only sufficient to move one piston at a time so that coincident movement of more than one piston is impossible due to the fact that the pressure drop occurring across any one of the restricted flow spaces is not great enough to move the related piston if fluid is also flowing through the restricted flow space of another piston at the same time. Thus, the pistons must be raised sequentially with fluid being supplied to only one cylinder at a time, and the next succeeding cylinder being supplied with fluid only after the first piston has been completely raised and the flow of fluid through the restricted flow space minimized by the mating of the conical surface 127 of the piston 124 with conical surface 123 of the upper end of the cylinder. After all pistons and their associated safety rods have been fully raised the flow to the actuator system may be reduced to a predetermined reduced flow rate sufficient to maintain all of the pistons in the upper position. This predetermined reduced flow rate is such that, should one piston fall away from its uppermost position, the flow rate through the restricted flow space is sufficiently increased that the flow supplied to the remaining actuators is insufficient to maintain them in the upper position and they will all fall. The same holds true for the operation of the actuators during the initial movement of the safety rods out of the reactor core so that, should some of the safety rods be completely out of the core and, during the withdrawal of an additional safety rod, one of the first rods should fall, the remaining rods will also fall. It will thus be seen that the safety rod actuators of the present invention are fail-safe since, should even one safety rod be accidentally inserted into the reactor core, all of the safety rods will be inserted preventing any hazardous operating conditions from arising. Likewise, should failure of the actuator fluid system occur all of the safety rods will be inserted, thereby terminating a chain reaction.

One specific arrangement of an actuator system utilizes cylinders having an inside diameter of 3 inches with pistons having an outer diameter of 2.97 inches disposed therein. The actuators have a travel of 60 inches from the full-down to the full-up position. The safety rods each weigh 80 pounds and, in a reactor having downward coolant flow through the fuel elements containing the safety rods, a core pressure drop of 150 p.s.i. will impose an additional hydraulic load of 450 pounds on each safety rod. Under these conditions a differential pressure of 80 to 100 p.s.i. across the actuator pistons will be sufficient to move the safety rod out of the core. To achieve this differential pressure a flow rate of approximately 5 cubic feet per minute must be supplied to the actuator and a reduced flow rate of approximately 2 cubic feet per minute will be sufficient to maintain all of the safety rods in the upper position. Under these conditions it will take approximately 5 seconds per safety rod to remove all of them from the core while, upon a reduction of the flow rate to the actuator system below that necessary to hold all of the rods in the uppermost position, all of the safety rods will be at least 80% inserted within the core in less than one second.

FIG. 3 schematically illustrates a reactor system incorporating the reactor illustrated in FIG. 1 and a safety rod actuator system having three safety rods. In this schematic illustration the reactor coolant fluid is supplied to the reactor inlet nozzle 24 by a pump 142 through line 160. The coolant passes through the reactor where it absorbs the heat generated by the chain reaction therein and leaves the reactor through the outlet nozzle 34 and passes through a heat exchanger 144, or other form of heat sink, and returns to the inlet of pump 142. In this arrangement the reactor has a pressure drop of approximately 150 p.s.i. from the inlet to the reactor to the outlet so that the actuator fluid may be obtained from the outlet of pump 142 and be discharged from the upper end of the cylinder 100 to the lower pressure portion of the reactor, thereby making available a pressure drop of approximately 150 p.s.i. across the restricted flow space of the actuator mechanism 11. In the arrangement illustrated in FIG. 3, utilizing the reactor coolant as the actuator fluid, a portion of the reactor coolant fluid is tapped off the reactor inlet line 160 at the outlet of pump 142 through line 146. Valve 148 controls the flow rate of the fluid to the actuator system and during the removal of the safety rods from the core permits full flow thereto. Before valve 148 is opened, valves 150, 150A and 150B in lines 116, 116A and 116B to the respective safety rod actuators are closed. After valve 148 is opened, valve 150 in line 116 is opened permitting the fluid to flow to its associated actuator causing the piston to move upwardly until it reaches the upper limit of travel, when the mating of conical surfaces 127 and 123 reduces the flow rate therethrough. With valve 150 still open, valve 150A in line 116A is then opened until its associated safety rod is fully raised. At that time, valve 150B in line 116B is opened, raising its associated safety rod. When all of the safety rods are in their uppermost position valve 148 may be partially closed, reducing the actuator fluid flow to the predetermined reduced rate sufficient to maintain the safety rods in their uppermost position. The reactor may then be operated, controlled by the regulating rod 71 in a manner well known in the art. When it is desired to terminate the chain reaction, valve 148 is closed, stopping the flow of actuator fluid to the actuator mechanisms 11, and the weight of the safety rods and the hydraulic forces imposed by the core pressure drop cause the safety rods to fall into the core, thereby terminating the chain reaction. During normal reactor operation should one of the safety rods accidentally fall, the flow of actuator fluid through the restricted flow space will sufficiently increase to lower the flow to the remaining safety rods below that needed to maintain them in the upper position and they too will fall, terminating the chain reaction and preventing any hazardous conditions from arising. It should be noted that the predetermined reduced flow rate is less than that necessary to provide the pressure drop required to raise one safety rod. Likewise, should failure occur in the actuator fluid piping system or in the reactor coolant circuit, the flow of fluid to the actuators will automatically be reduced causing the safety rods to be inserted, shutting the reactor down.

Meters 152, 152A and 152B, provided in a parallel flow relationship with valves 150, 150A and 150B in lines 116, 116A and 116B, respectively, are provided with orifices 154, 154A and 154B, to measure the flow of fluid through the respective actuator supply lines so that when the actuators are in either the full-up or the full-down position the reduced flow rate therethrough will be indicated by the meters 152. In order to distinguish between the full-up and the full-down of the actuator mechanisms, line 136, which is common to all actuator mechanisms, has a flow meter 156 in series with an orifice 158 and is connected to line 146 between the pump 142 and valve 148. When a high flow rate is indicated by meter 156 it indicates that at least one of the safety rods is not fully removed from the reactor core, but when all of the safety rods are out of the core the flow rate indicated by meter 156 will be substantially reduced since every orifice 134 to which line 136 communicates (see FIG. 2) will be covered by the associated piston 124. Should it be desired to indicate the exact position of individual safety rods a separate line 136, and its associated meter 156, can be provided for each actuator. In this case, a high flow rate through meters 152 and 156 will indicate that the safety rod is somewhere between its uppermost and its lowermost position while a high flow rate indication only by meter 156 will indicate that the safety rod is in its lowermost position and a low flow rate indication by both meters 152 and 156 will indicate that the actuator is in its uppermost position.

While the actuators illustrated have been shown disposed below the reactor core, the safety rod actuators can be utilized above the reactor core so long as the safety rods are withdrawn from the core when they are in their uppermost position.

The present invention provides a safety rod actuator system which is both simple and fail-safe, requiring little, if any, auxiliary equipment. Furthermore, the safety rod actuator of the present invention may be operated by the reactor coolant fluid utilizing the pressure drop normally occurring across the reactor core. However, should it be desirable to utilize a separate actuator fluid supply system this can be accomplished with a minimum amount of auxiliary equipment.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear safety rod actuator comprising a cylinder, a piston arranged in said cylinder, one end of said piston arranged to be connected to a safety rod, said cylinder having an internal diameter smaller at each end than the diameter of said piston and an internal diameter between said ends greater than the diameter of said piston to form a restricted flow space between said piston and said cylinder, means for introducing a fluid at a predetermined flow rate into one end of said cylinder for passage therethrough and through said restricted flow space, the size of said restricted flow space being related to said predetermined flow rate to produce a pressure drop across said piston sufficient to move said piston to the opposite end of said cylinder, means cooperating with said piston and said cylinder to minimize said fluid flow through said restricted flow space when said piston reaches the opposite end of said cylinder, said piston being maintained at the opposite end of said cylinder by a predetermined reduced rate of said fluid flow, and means for returning said piston to the first end of said cylinder when said flow rate falls below said predetermined reduced rate.

2. A nuclear safety rod actuator comprising a cylinder, a piston arranged in said cylinder, one end of said piston arranged to be connected to a safety rod, said cylinder having an internal diameter smaller at each end than the diameter of said piston and an internal diameter between said ends greater than the diameter of said piston to form a restricted flow space between said piston and said cylinder, means for introducing a fluid at a predetermined flow rate into one end of said cylinder for passage therethrough and through said restricted flow space, the size of said restricted flow space being related to said predetermined flow rate to produce a pressure drop across said piston sufficient to move said piston to the opposite end of said cylinder, a valve seat formed in the opposite end of said cylinder, a valve face formed on said piston, said valve face arranged to mate with said valve seat to minimize said fluid flow through said restricted flow space when said piston reaches the opposite end of said cylinder, said piston being maintained at the opposite end of said cylinder by a predetermined reduced rate of said fluid flow, and means for returning said piston to the first end of said cylinder when said flow rate falls below said predetermined reduced rate.

3. A nuclear safety rod actuator comprising a cylinder, a piston arranged in said cylinder, one end of said piston arranged to be connected to a safety rod, said cylinder having an internal diameter smaller at each end than the diameter of said piston and an internal diameter between said ends greater than the diameter of said piston to form a restricted annular flow space between said piston and said cylinder, means for introducing a fluid at a predetermined flow rate into one end of said cylinder for passage therethrough and through said restricted flow space, the size of said restricted annular flow space being related to said predetermined flow rate to produce a pressure drop across said piston sufficient to move said piston to the opposite end of said cylinder, a valve seat formed in the opposite end of said cylinder, a valve face formed on said piston, said valve face arranged to mate with said valve seat to minimize said fluid flow through said restricted flow space when said piston reaches the opposite end of said cylinder, means for reducing said fluid flow to a predetermined reduced flow rate to maintain said piston at the opposite end of said cylinder, and means for returning said piston to the first end of said cylinder when said flow rate falls below said predetermined reduced rate.

4. A nuclear safety rod actuator comprising a cylinder, a piston arranged in said cylinder, one end of said piston arranged to be connected to a safety rod, said cylinder having an internal diameter smaller at each end than the diameter of said piston and an internal diameter between said ends greater than the diameter of said piston to form a restricted annular flow space between said piston and said cylinder, means for introducing a fluid at a predetermined flow rate into one end of said cylinder for passage therethrough and through said restricted flow space, the size of said restricted annular flow space being related to said predetermined flow rate to produce a pressure drop across said piston sufficient to move said piston to the opposite end of said cylinder, means cooperating with said piston and said cylinder to minimize said fluid flow through said restricted flow space when said piston reaches the opposite end of said cylinder, said piston being maintained at the opposite end of said cylinder by a predetermined reduced rate of said fluid flow, said predetermined reduced fluid flow rate being the minimum rate necessary to maintain said piston at said opposite end of said cylinder, and means for returning said piston to the first end of said cylinder when said flow rate falls below said predetermined reduced rate.

5. A nuclear safety rod system comprising a plurality of safety rod actuators each having a cylinder and a piston arranged in said cylinder, one end of each of said pistons arranged to be connected to a safety rod, each of said cylinders having an internal diameter smaller at each end than the diameter of said piston and an internal diameter between said ends greater than the diameter of said piston to form a restricted flow space between said piston and said cylinder, means for introducing a fluid at a predetermined flow rate to said safety rod system, means for introducing said fluid into one end of a first cylinder, the size of said restricted flow space being related to said predetermined flow rate to produce a pressure drop across said piston sufficient to move said piston to the opposite end of said cylinder, means cooperating with each of said pistons and said cylinders to minimize said fluid flow through said restricted flow space when said piston reaches the opposite end of said cylinder, means for sequentially introducing said fluid into each successive cylinder when the previous piston has reached the opposite end of its corresponding cylinder until all of said pistons are at the opposite ends of said cylinders, means for reducing said fluid flow to said safety rod system to a predetermined reduced flow rate to maintain said pistons at the opposite ends of said cylinders, and means for returning said pistons to the first end of said cylinders when said flow rate falls below said predetermined reduced rate.

6. A nuclear safety rod system comprising a plurality of safety rod actuators each having a cylinder and a piston arranged in said cylinder, one end of each of said pistons arranged to be connected to a safety rod, each of said cylinders having an internal diameter smaller at each end than the diameter of said piston and an internal diameter between said ends greater than the diameter of said piston to form a restricted flow space between said piston and said cylinder, means for introducing a fluid at a predetermined flow rate to said safety rod system, means for introducing said fluid into one end of a first cylinder, the size of said restricted flow space being related to said predetermined flow rate to produce a pressure drop across said piston sufficient to move said piston to the opposite end of said cylinder, means cooperating with each of said pistons and said cylinders to minimize said fluid flow through said restricted flow space when said piston reaches the opposite end of said cylinder, means for sequentially introducing said fluid into each successive cylinder when the previous piston has reached the opposite end of its corresponding cylinder until all of said pistons are at the opposite ends of said cylinders, means for reducing said fluid flow to said safety rod system to a predetermined reduced flow rate to maintain said pistons at the opposite ends of said cylinders, said predetermined reduced flow rate being sufficient to maintain said pistons at the opposite end of said cylinders so long as the flow rate through all of said restricted flow spaces is minimized, and means for returning said pistons to the first end of said cylinders when said flow rate falls below said predetermined reduced rate.

7. A nuclear safety rod system comprising a plurality of safety rod actuators each having a cylinder and a piston arranged in said cylinder, one end of each of said pistons arranged to be connected to a safety rod, each of said cylinders having an internal diameter smaller at each end than the diameter of said piston and an internal diameter between said ends greater than the diameter of said piston to form a restricted flow space between said piston and said cylinder, means for introducing a fluid at a predetermined flow rate to said safety rod system, means for introducing said fluid into one end of a first cylinder, the size of said restricted flow space being related to said predetermined flow rate to produce a pressure drop across said piston sufficient to move said piston to the opposite end of said cylinder, means cooperating with each of said pistons and said cylinders to minimize said fluid flow through said restricted flow space when said piston reaches the opposite end of said cylinder, means for sequentially introducing said fluid into each successive cylinder when the previous piston has reached the opposite end of its corresponding cylinder until all of said pistons are at the opposite ends of said cylinders, means for reducing said fluid flow to said safety rod system to a predetermined reduced flow rate to maintain said pistons at the opposite ends of said cylinders, said predetermined reduced flow rate being sufficient to maintain said pistons at the opposite end of said cylinders so long as the flow rate through all of said restricted flow spaces is minimized, said predetermined reduced flow rate being such that flow through any one restricted flow space caused by one of said pistons moving from said opposite end of said cylinder reduces the flow to the remaining cylinders below that required to maintain said pistons at the opposite end of said cylinders so that all pistons then return to the first end of said cylinders.

8. A nuclear safety rod system comprising a plurality of safety rod actuators each having a cylinder and a piston arranged in said cylinder, one end of each of said pistons arranged to be connected to a safety rod, each of said cylinders having an internal diameter smaller at each end than the diameter of said piston and an internal diameter between said ends greater than the diameter of said piston to form a restricted flow space between said piston and said cylinder, means for introducing a fluid at a predetermined flow rate to said safety rod system, means for introducing said fluid into one end of a first cylinder, the size of said restricted flow space being related to said predetermined flow rate to produce a pressure drop across said piston sufficient to move said piston to the opposite end of said cylinder, means cooperating with each of said pistons and said cylinders to minimize said fluid flow through said restricted flow space when said piston reaches the opposite end of said cylinder, means for sequentially introducing said fluid into each successive cylinder when the previous piston has reached the opposite end of its corresponding cylinder until all of said pistons are at the opposite ends of said cylinders, means for reducing said fluid flow to said safety rod system to a predetermined reduced flow rate to maintain said pistons at the opposite ends of said cylinders, means for returning said pistons to the first end of said cylinders when said flow rate falls below said predetermined reduced rate, and means for decelerating said pistons at each end of said cylinders.

9. A nuclear safety rod system comprising a plurality of safety rod actuators each having a cylinder and a piston arranged in said cylinder, one end of each of said pistons arranged to be connected to a safety rod, each of said cylinders having an internal diameter smaller at each end than the diameter of said piston and an internal diameter between said ends greater than the diameter of said piston to form a restricted flow space between said piston and said cylinder, means for introducing a fluid at a predetermined flow rate to said safety rod system, means for introducing said fluid into one end of a first cylinder, the size of said restricted flow space being related to said predetermined flow rate to produce a pressure drop across said piston sufficient to move said piston to the opposite end of said cylinder, means cooperating with each of said pistons and said cylinders to minimize said fluid flow through said restricted flow space when said piston reaches the opposite end of said cylinder, means for sequentially introducing said fluid into each successive cylinder when the previous piston has reached the opposite end of its corresponding cylinder until all of said pistons are at the opposite ends of said cylinders, means for reducing said fluid flow to said safety rod system to a predetermined reduced flow rate to maintain said pistons at the opposite ends of said cylinders, means for returning said pistons to the first end of said cylinders when said flow rate falls below said predetermined reduced rate, means for decelerating said pistons at each end of said cylinders, and means for indicating the position of said pistons in said cylinders.

10. The method of operating a nuclear safety rod actuator having a piston arranged in a cylinder with a restricted flow space between said piston and said cylinder comprising the steps of raising said safety rod by introducing a fluid into said cylinder at a predetermined flow rate for passage through said restricted flow space to produce a pressure drop across said restricted flow space moving said piston to the opposite end of said cylinder, reducing said fluid flow to a predetermined intermediate value when said piston reaches the opposite end of said cylinder to maintain said piston in that position, and reducing said fluid flow below said predetermined intermediate value to return said piston to the first end of said cylinder.

11. The method of operating a nuclear safety rod actuator having a piston arranged in a cylinder with a restricted flow space between said piston and said cylinder comprising the steps of raising said safety rod by introducing a fluid into said cylinder at a predetermined flow rate for passage through said restricted flow space to produce a pressure drop across said restricted flow space moving said piston to the opposite end of said cylinder, minimizing said fluid flow through said restricted flow space when said piston reaches the opposite end of said cylinder, reducing said fluid flow to said cylinder to a predetermined intermediate value sufficient to maintain said piston at the opposite end of said cylinder, and reducing said fluid flow below said predetermined intermediate value to return said piston to the first end of said cylinder.

12. The method of operating a plurality of safety rod actuators each having a piston arranged in a cylinder with a restricted flow space between said piston and said cylinder comprising the steps of sequentially raising said rods one at a time by introducing a fluid into a first cylinder at a predetermined flow rate sufficient to produce a pressure drop across said restricted flow space to move the corresponding piston to the opposite end of said cylinder, minimizing said fluid flow through said restricted flow space of said first cylinder when said piston reaches the opposite end of said cylinder, repeating said first two steps until all of said pistons have reached the opposite end of said cylinders, reducing the flow rate to a predetermined intermediate value to hold said pistons at the opposite end of said cylinders, and reducing the flow rate below said predetermined intermediate value to return said pistons to the first end of said cylinders.

13. The method of operating a plurality of safety rod actuators each having a piston arranged in a cylinder with a restricted flow space between said piston and said cylinder comprising the steps of sequentially raising said rods one at a time by introducing a fluid into a first cylinder at a predetermined flow rate sufficient to produce a pressure drop across said restricted flow space to move the corresponding piston to the opposite end of said cylinder, minimizing said fluid flow through said restricted flow space of said first cylinder when said piston reaches the opposite end of said cylinder, repeating said first two steps until all of said pistons have reached the opposite end of said cylinders, reducing the flow rate to a predetermined intermediate value below said predetermined flow rate which intermediate flow rate is sufficient to maintain said pistons at the opposite end of said cylinders so long as said fluid flow through all of said restricted flow spaces is minimized, and reducing the flow rate below said predetermined intermediate value to return said pistons to the first end of said cylinders.

14. The method of operating a plurality of safety rod actuators each having a piston arranged in a cylinder with a restricted flow space between said piston and said cylinder comprising the steps of sequentially raising said rods one at a time by introducing a fluid into a first cylinder at a predetermined flow rate sufficient to produce a pressure drop across said restricted flow space to move the corresponding piston to the opposite end of said cylinder, minimizing said fluid flow through said restricted flow space of said first cylinder when said piston reaches the opposite end of said cylinder, repeating said first two steps until all of said pistons have reached the opposite end of said cylinders, reducing the flow rate to a predetermined intermediate value below said predetermined flow rate which intermediate flow rate is sufficient to maintain said pistons at the opposite end of said cylinders so long as said fluid flow through all of said restricted flow spaces is minimized, the movement of one of said pistons from the opposite end of the corresponding cylinder increasing the flow rate through the corresponding restricted flow space and reducing the flow rate to all cylinders below said intermediate flow rate causing all of said pistons to return to the first end of said cylinders.

References Cited by the Examiner

UNITED STATES PATENTS 2,855,899  10/1958  Beaty _____ 176—36
2,975,119  3/1961   Emmons _____ 176—36

OTHER REFERENCES

Schultz: Control of Nuclear Reactors and Power Plants, 1955, published by McGraw-Hill, pages 110–113.

LEON D. ROSDOL, *Primary Examiner.*

REUBEN EPSTEIN, *Examiner.*

M. R. DINNIN, H. E. BEHREND, *Assistant Examiners.*